United States Patent
Fong et al.

(10) Patent No.: US 10,519,580 B2
(45) Date of Patent: Dec. 31, 2019

(54) TITANIUM CARBIDE (TIC) NANO-FIBROUS FELTS

(71) Applicants: Hao Fong, Pierre, SD (US); Lifeng Zhang, Pierre, SD (US); Yong Zhao, Pierre, SD (US); Zhengtao Zhu, Pierre, SD (US)

(72) Inventors: Hao Fong, Pierre, SD (US); Lifeng Zhang, Pierre, SD (US); Yong Zhao, Pierre, SD (US); Zhengtao Zhu, Pierre, SD (US)

(73) Assignee: South Dakota Board of Regents, Pierre, SD (US)

( * ) Notice: Subject to any disclaimer, the term of this patent is extended or adjusted under 35 U.S.C. 154(b) by 793 days.

(21) Appl. No.: 14/551,348

(22) Filed: Nov. 24, 2014

(65) Prior Publication Data

US 2015/0139888 A1    May 21, 2015

Related U.S. Application Data

(62) Division of application No. 13/482,981, filed on May 29, 2012, now Pat. No. 8,932,513.
(Continued)

(51) Int. Cl.
*C01B 32/00* (2017.01)
*D04H 1/728* (2012.01)
(Continued)

(52) U.S. Cl.
CPC .............. *D04H 1/728* (2013.01); *B82Y 30/00* (2013.01); *B82Y 40/00* (2013.01); *C01B 32/921* (2017.08);
(Continued)

(58) Field of Classification Search
CPC ...... C01B 31/305; C01B 32/00; D01D 5/0007
(Continued)

(56) References Cited

U.S. PATENT DOCUMENTS

| 4,931,316 A | 6/1990 | Johnson |
| 2005/0254545 A1 | 11/2005 | Daimer |

(Continued)

OTHER PUBLICATIONS

Dash, Ranjan et al., "Titanium carbide derived nanoporous carbon for energy-related applications," Jun. 21, 2006, Carbon, vol. 44, pp. 2489-2497.*

(Continued)

*Primary Examiner* — Peter Y Choi
(74) *Attorney, Agent, or Firm* — McKee, Voorhees & Sease, PLC

(57) ABSTRACT

A method of synthesizing mechanically resilient titanium carbide (TiC) nanofibrous felts comprising continuous nanofibers or nano-ribbons with TiC crystallites embedded in carbon matrix, comprising: (a) electrospinning a spin dope for making precursor nanofibers with diameters less than 0.5 J.Lm; (b) overlaying the nanofibers to produce a nanofibrous mat (felt); and then (c) heating the nano-felts first at a low temperature, and then at a high temperature for making electrospun continuous nanofibers or nano-ribbons with TiC crystallites embedded in carbon matrix; and (d) chlorinating the above electrospun nano-felts at an elevated temperature to remove titanium for producing carbide derived carbon (CDC) nano-fibrous felt with high specific surface areas.

8 Claims, 9 Drawing Sheets

Related U.S. Application Data

(60) Provisional application No. 61/495,706, filed on Jun. 10, 2011.

(51) Int. Cl.

| | |
|---|---|
| *D04H 1/4209* | (2012.01) |
| *D04H 1/4382* | (2012.01) |
| *B82Y 30/00* | (2011.01) |
| *B82Y 40/00* | (2011.01) |
| *C04B 35/622* | (2006.01) |
| *D01D 5/00* | (2006.01) |
| *C04B 35/56* | (2006.01) |
| *C04B 35/634* | (2006.01) |
| *D01F 9/12* | (2006.01) |
| *C01B 32/921* | (2017.01) |
| *H01G 11/36* | (2013.01) |

(52) U.S. Cl.
CPC .... *C04B 35/5611* (2013.01); *C04B 35/62277* (2013.01); *C04B 35/634* (2013.01); *D01D 5/0007* (2013.01); *D01F 9/12* (2013.01); *D04H 1/4209* (2013.01); *D04H 1/4382* (2013.01); *C01P 2004/16* (2013.01); *C04B 2235/3843* (2013.01); *C04B 2235/422* (2013.01); *C04B 2235/425* (2013.01); *C04B 2235/441* (2013.01); *C04B 2235/5264* (2013.01); *C04B 2235/77* (2013.01); *C04B 2235/781* (2013.01); *C04B 2235/80* (2013.01); *D10B 2101/14* (2013.01); *H01G 11/36* (2013.01); *Y10T 442/50* (2015.04)

(58) Field of Classification Search
USPC .......................................................... 442/349
See application file for complete search history.

(56) References Cited

U.S. PATENT DOCUMENTS

| | | | |
|---|---|---|---|
| 2006/0284218 A1 | 12/2006 | Kaner et al. | |
| 2009/0301902 A1* | 12/2009 | Gogotsi | B01J 20/20 206/0.7 |
| 2010/0107731 A1 | 5/2010 | Kippeny | |
| 2010/0202956 A1 | 8/2010 | Bogicevic | |
| 2011/0151255 A1 | 6/2011 | Kim et al. | |

OTHER PUBLICATIONS

Zhang, Lifeng et. al., "Synthesis of continuous TiC nanofibers and/or nanoribbons through electrospinning followed by carbothermal reduction," Nanoscale, Jul. 8, 2010, 2, pp. 1670-1673. (Year: 2010).*

* cited by examiner

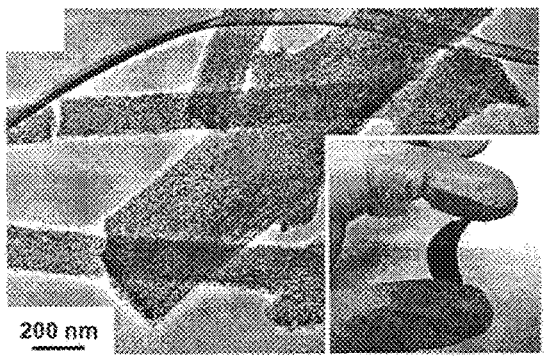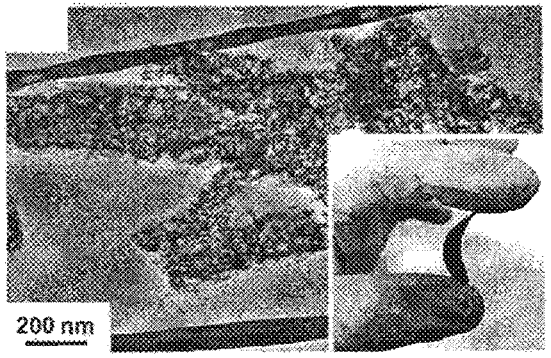
FIG. 3A　　　　　　　　　　FIG. 3B
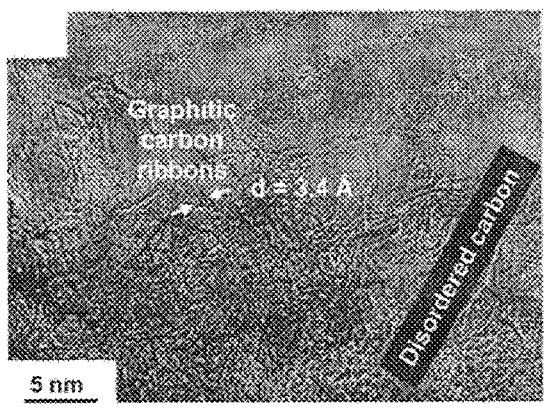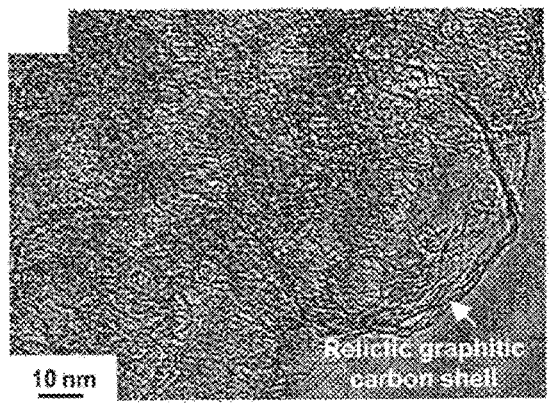
FIG. 3C　　　　　　　　　　FIG. 3D

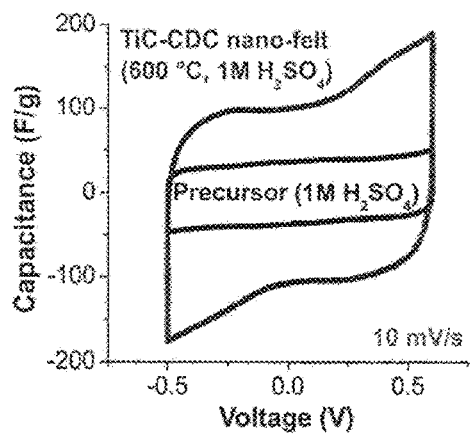 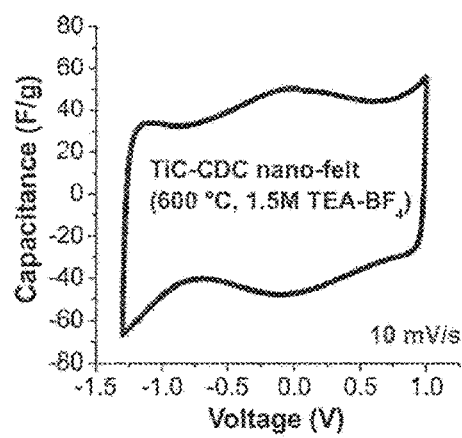
FIG. 7A    FIG. 7B
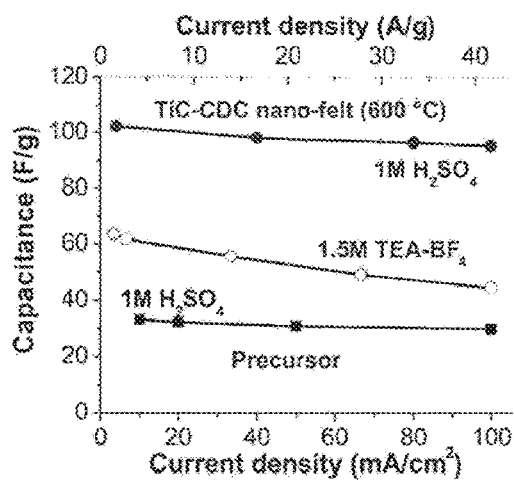 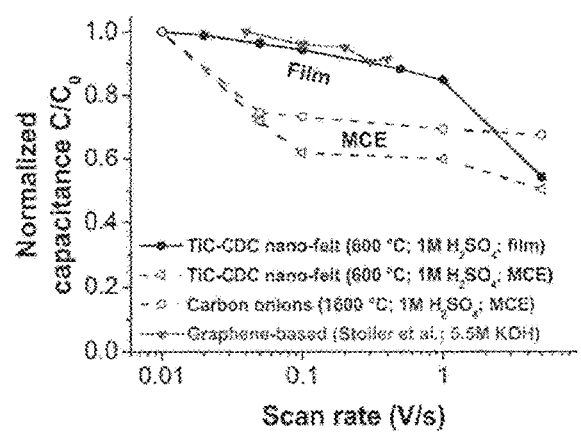
FIG. 7C    FIG. 7D
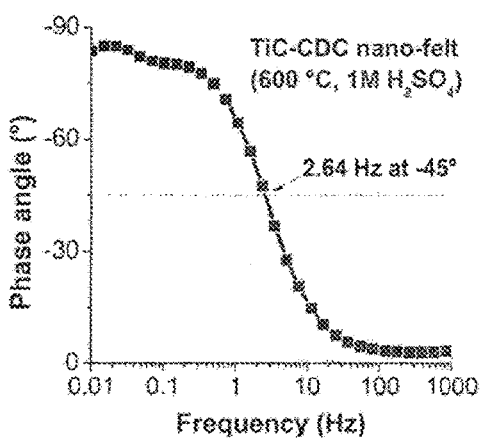 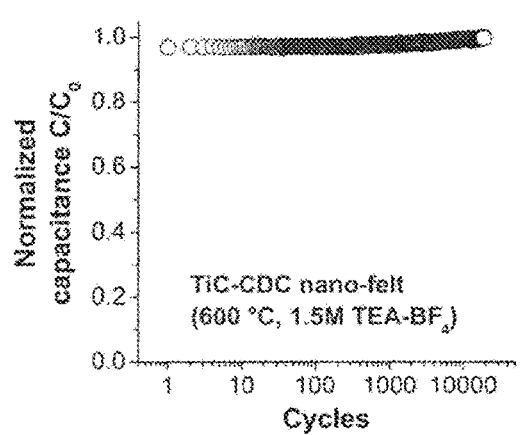
FIG. 7E    FIG. 7F

TITANIUM CARBIDE (TIC) NANO-FIBROUS FELTS

CROSS REFERENCE TO RELATED APPLICATIONS

This is a Divisional Application of U.S. Ser. No. 13/482,981 filed May 29, 2012, now U.S. Pat. No. 8,932,513, which claims priority under 35 U.S.C. § 119 to provisional applications U.S. Ser. No. 61/495,706 filed Jun. 10, 2011, both of which are herein incorporated by reference in their entirety.

GOVERNMENT INTEREST

This invention was made with government support under Grant No. DE-FG02-08ER64624 awarded by the Department of Energy. The government has certain rights in the invention.

TECHNICAL FIELD

The present invention relates to the preparation of electrospun TiC nanofibers and nano-ribbons, as well as their overlaid mats (felts); theses felts can be further treated through chlorination at elevated temperature for the preparation of carbide-derived-carbon (CDC) with high porosity, enhanced capacitance and other desirable electrochemical properties.

BACKGROUND OF THE INVENTION

Titanium carbide (TiC) has a high melting point, hardness and wear resistance. Therefore, it has been used for preparations of cermets, cutting tool tips and wear resistant coatings. Recently, TiC has attracted attention as a precursor for developing porous carbonaceous materials with pore sizes on the order of a few nanometers. Such materials are called "carbide derived carbon" (CDC). The synthesis of CDC is based upon selective removal of the Ti metal from a metal carbide. For example, the Ti can be removed from TiC using chlorine ($Cl_2$) gas at elevated temperatures.

Large pore volumes together with the concomitant high specific surface areas make CDC useful in applications including catalyst support, gas storage and super-capacitors. In addition, such materials have superior thermal conductivity and can therefore also be used as phase change materials in thermal energy systems.

To date, however, nano-scale TiC materials are only available as particles, powders, and thin films. Thus, no one has yet devised a system for making continuous TiC nanofibers, or nano-fibrous felts formed from such nanofibers. As will be shown, the present invention provides exactly such a system.

SUMMARY OF THE INVENTION

The present invention provides a system for electrospinning nanofibers or nano-ribbons with TiC crystallites embedded in carbon matrix, and for overlaying these fibers to produce a fibrous mat (felt). This fiber mat/felt can then be chlorinated at high temperatures to remove the Ti, resulting in a CDC nano-fibrous felt having high specific surface area and excellent electro-capacitance properties.

In accordance with one preferred aspect of the present invention, titanium (IV) n-butoxide (TiBO, Aldrich catalogue number 244112) and furfuryl alcohol (FA, Aldrich catalogue number 185930) were selected as the titanium and carbon sources, respectively. In accordance with the present invention, electrospinning a spin dope containing TiBO and FA (resulting in a uniform dispersion of titanium and carbon) was followed by carbothermal reduction to produce nanofibers or nano-ribbons with TiC crystallites embedded in carbon matrix. After chlorination treatment, the resulting CDC nano-felt (formed by overlaying the nanofibers or nano-ribbons) comprises a disordered and extremely porous carbon as the fiber/ribbon matrix.

The nano-felts that are provided by the present nanofibers or nano-ribbons being placed together over top of one another have many advantages. For example, the present nano-felts are mechanically flexible and resilient. As such, they can potentially be used as an electrode material for a super-capacitor application without the addition of any binder. (Such binders are typically required to fabricate electrodes from powders). Unfortunately, such binders significantly reduce the device performance to both increased resistance and the addition of dead weight.

Yet another potential application of the present nano-felts is in catalysis applications. TiC is a catalyst for the oxidation of hydrogen ($H_2$) gas; additionally, the TiC nano-felts with meso-porous morphological structure (the specific surface area being approximately 400 $m^2/g$) can be further impregnated with platinum (or other catalyst) clusters and/or nano-particles for catalysis applications (particularly in fuel cells).

BRIEF DESCRIPTION OF THE DRAWINGS

FIGS. 3A and 3C are TEM images of the TiC-CDC nano-felts after chlorination at 400° C.

FIGS. 3B and 3D are TEM images of the TiC-CDC nano-felts after chlorination at 600° C.

FIG. 7A illustrates cyclic voltammograms for the TiC-CDC nano-felt and its electrospun TiC nano-felt precursor produced according to the present invention (in 1 M $H_2SO_4$).

FIG. 7B illustrates a cyclic voltammogram for the TiC-CDC nano-felt produced according to the present invention (in 1.5 M TEA-BF).

FIG. 7C illustrates gravimetric capacitance and galvanic charge/discharge measurements for the TiC-CDC nano-felt and its electrospun TiC nano-felt precursor in organic and aqueous electrolytes.

FIG. 7D illustrates fade vs. normalized capacitance for the TiC-CDC nano-felt and its electrospun TiC nano-felt precursor.

FIG. 7E shows the frequency dispersion of the phase angle for the TiC-CDC nano-felt.

FIG. 7F shows the cycling stability at 100 mA galvanostatic charge/discharge for the TiC-CDC nano-felt.

Figure 1A:
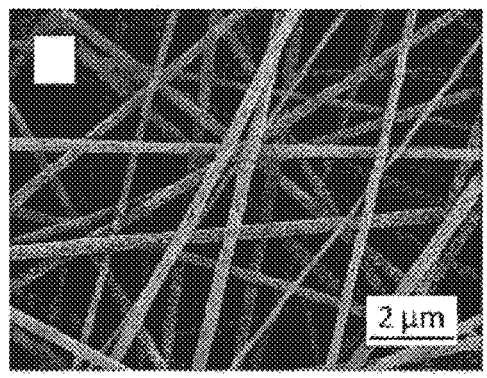
FIG. 1A is a Scanning Electron Microscope (SEM) image showing the representative morphology of electrospun precursor nanofibers.

DETAILED DESCRIPTION OF THE DRAWINGS (a) Theory of the Invention:

In accordance with the present invention, continuous nanofibers or nano-ribbons with TiC crystallites embedded in carbon matrix have been synthesized via electrospinning followed by pyrolysis (i.e., carbothermal reduction). These nanofibers can be further treated with $Cl_2$ gas to be converted into TiC-CDC nanofibers.

In one preferred aspect, the present method was performed and demonstrated that electrospinning of a spin dope containing titanium (IV) n-butoxide (TiBO, Aldrich catalogue number 244112) and furfuryl alcohol (FA, Aldrich catalogue number 185930) resulted in nanofibers having a uniform dispersion of titanium and carbon sources. The carbothermal reduction of these nanofibers then resulted in continuous nanofibers with TiC crystallites embedded in carbon matrix. These nanofibers were overlayed onto one another, resulting in a mechanically resilient nano-felt having excellent electrochemical properties.

(b) An Overview of the Electrospinning of the Nanofibers:

The first step in the present method was to synthesize TiC. In general, TiC can be synthesized by precursors containing Ti and C. In accordance with one preferred aspect of the present invention, titanium (IV) n-butoxide (TiBO, Aldrich catalogue number 244112) and furfuryl alcohol (FA, Aldrich catalogue number 185930) were selected as the titanium and carbon sources, respectively. It is to be understood, however, that other methods of synthesizing the TiC are also contemplated within the scope of the present invention.

For example, although chemical vapor deposition can be used to prepare TiC, another preferred method is to use a high temperature reaction between the two precursors containing the Ti and C separately. Suitable titanium precursors include Ti metal, $TiCl_4$ and $TiO_2$. Suitable carbon precursors include $C_2H_2$, $CCl_4$, $CH_4$ and $CaC_2$. A carbothermal reduction using $TiO_2$ and carbon black, activated carbon, carbon film or cellulose can also be used. The use of titanium alkoxide and organic/polymeric materials as the source has also been explored.

The second step in the present method was to electrospin nanofibers. To prepare the spin dope for electrospinning, polyvinylpyrrolidone (PVP, Aldrich number 437190) was selected as the carrying polymer; N,N-dimethylformamide (DMF, Aldrich catalogue number 227056) was selected as the solvent, and acetic acid (HAc, Aldrich catalogue number 537020) was added into the spin dope as the catalyst for hydrolysis of TiBO and polymerization of FA. It is to be understood, however, that the present invention is not so limited and that other suitable chemicals may be used when preparing the spin dope.

Moreover, although numerous spin dopes and preparation procedures were investigated, the preferred one was a spin dope containing 10 wt % TiBO, 10 wt % FA, 10 wt % PVP and 2.5 wt % HAc. DMF was used as a solvent for this preparation. Again, it is to be understood that other compositions and preparations may also be used, all keeping within the scope of the present invention. The spin dope was then magnetically stirred for 48 hours. Next, a plastic syringe was filled with the spin dope for the electrospinning. The electrospinning setup included an ES-30P high voltage power supply, an 18-gauge needle with a 90° blunt tip. An electrically grounded roller was placed 10 inches below the needle tip. 15 kV were applied to the needle and a feed rate of 1.0 ml/h was maintained using a KDS-200 syringe pump. The roller was rotated at 100 rpm.

The resulting electrospun precursor nanofibers were collected as an overlaid nanofiber-mat on a sheet of aluminum foil that covered the roller. The nanofiber mat was then kept under ambient conditions for 4 days to allow for completion of the chemical reactions inside the nanofibers.

(c) An Overview of the Carbothermal Reduction of the Nanofibers:

The third step in the present method was heating/pyrolysis. But first, after the electrospun nanofibers were collected on the aluminum foil, the nanofibers were peeled off of the aluminum foil, transferred into a ceramic foil, and then placed into a Lindberg 54453 Heavy Duty Tube Furnace for pyrolysis (i.e., carbothermal reduction).

In one preferred aspect of the present method, pyrolysis was accomplished by: (1) increasing the temperature at 5° C./min from about 25° C. to 325° C.; (2) holding the temperature at 325° C. for 6 hours; (3) increasing the temperature at 5° C./min to 1400° C.; (4) holding the temperature at 1400° C. for 12 hours; and then (5) allowing the material to cool to room temperature. A constant flow of argon gas was maintained through the furnace during this heat treatment.

It is to be understood that the present invention encompasses many different heat treatments in addition to the exemplary one described above. Temperatures and durations may be varied. Moreover, as will be discussed herein, different heat treatments resulted in nanofelts having different shapes, structures and physical properties. As such, the present invention covers any suitable high temperature pyrolysis treatments.

The fourth step in the present method was to expose the electrospun TiC nanofibers to $Cl_2$ gas (i.e., chlorination). The chlorination of TiC was governed by the following equation: $TiC+2Cl_2->TiCl_4+C$. It was found that chlorination effectively extracts Ti from the nanofiber mats (i.e., felts) while the overall morphologies of the nanofibrous felts can be well reserved (i.e., the transformation is conformal), with trace amounts of un-reacted nano-TiC found only in the nano-felt chlorinated at lower temperatures (e.g., at 200° C.). It is noteworthy that the chlorination treatment is carried out after the TiC nano-felts have been prepared (particularly for the application of super-capacitor); for other applications such as catalysis, the TiC nano-felts can be utilized directly without the chlorination treatment.

(d) The Resulting Nano-Structures:

Both the resulting electrospun precursor nanofibers and the final TiC nanofibers that made up the nano-felt were examined by Scanning Electron Microscope (SEM) and X-ray Diffraction (XRD). The following properties were found.

Figure 1B:
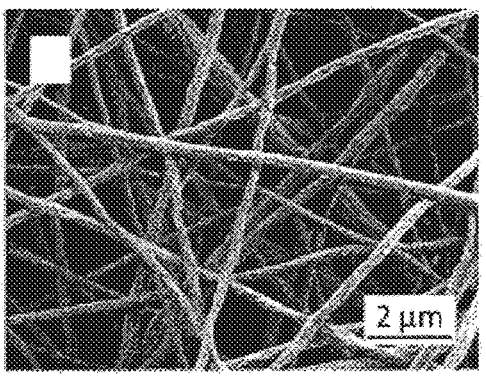
FIG. 1B is an SEM image showing the representative morphology of intermediate electrospun nanofibers.
Figure 1C:
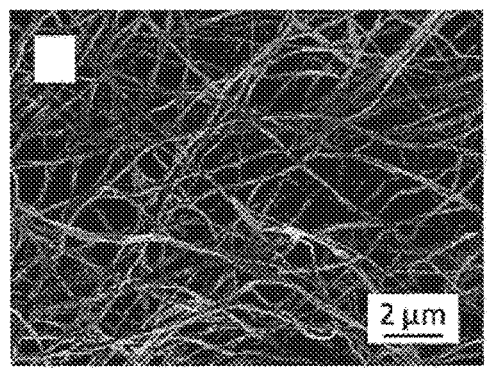
FIG. 1C is an SEM image showing the representative morphology of final electrospun TiC nanofibers at low magnification.
Figure 1D:
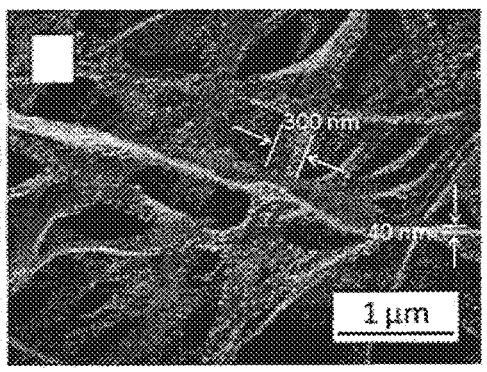
FIG. 1D is an SEM image showing the representative morphology of final electrospun nanofibers at high magnification.

(i) Physical Structure of the Nanofibers:

FIG. 1A shows an SEM image of the precursor nanofibers (being cylindrical fibers with diameters of 100-300 nm). As can been seen, these fibers were relatively uniform without any microscopically identifiable beads or beaded-nanofibers. An SEM image of the fibers after pyrolysis at 325° C. (FIG. 1B) shows that they retained their fibrous shape while the surfaces of the fibers became quite rough. As seen in FIG. 1C, the subsequent carbothermal reduction at 1400° C. in argon resulted in nano-ribbons having a width and thickness of approximately 300 nm and 40 nm, respectively.

However, it was experimentally determined that if the nanofibers were instead initially prepared at 425° C. (not 325° C.), then they displayed a cylindrical shape. It is thus believed that the partial decomposition of PVP at 325° C. resulted in the increase in surface roughness. However, the relatively fast heating rate of 5° C./min following carbothermal reduction likely prevented the partially decomposed PVP from completely decomposing before it became very rubbery. This resulted in the flattening of the fibers and the formation of ribbons.

Figure 2:
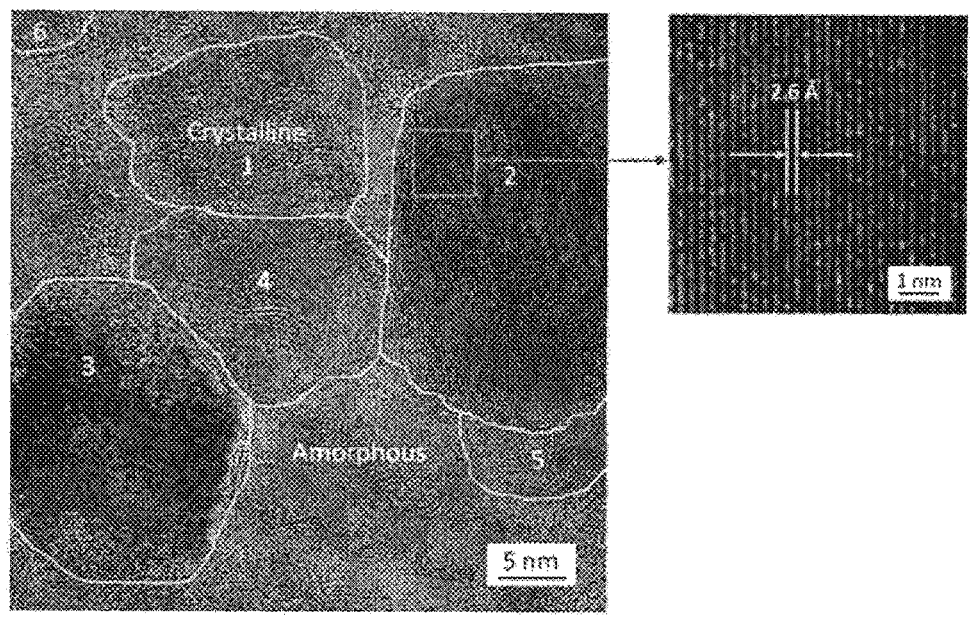
FIG. 2 is a TEM image of an electrospun nanofiber that consists of TiC crystallites (with sizes of ~30 nm or less) embedded in an amorphous matrix of carbon.

As can also be seen in FIG. 1C (low magnification) and 1D (high magnification), the final TiC nanofibers and/or nano-ribbons have tiny crystallite particles on their surfaces. High resolution Transmission Electron Microscopy (TEM) confirmed that the crystallites had sizes ranging from 5 nm to 30 nm, and that they were randomly distributed in an amorphous matrix. FIG. 2 shows a high-resolution TEM image in which crystallites (areas 1, 2 and 3) were highly ordered single crystals, whereas crystallites (areas 4, 5 and 6) contained defects and amorphous regions.

After selective removal of Ti through $Cl_2$ treatment at an elevated temperature, an extremely porous CDC nanofiber/nano-ribbon morphology was developed. In preferred aspects, the fibers have graphitic carbon ribbons embedded therein in a highly disordered carbon matrix. Graphitic carbon is preserved from the TiC nanofibers where a few graphene layers surround the TiC nanocrystallites.

It is believed that the following reactions occurred. First, electrospun precursor nanofibers were synthesized with the HAc and DMF evaporating during electrospinning. The TiBO was then converted to a Ti—O—Ti network (gel) through a sol-gel process. The FA was converted into poly(furfuryl alcohol) through condensation and/or dehydration. After pyrolysis in argon at 325° C., the intermediate nanofibers were formed, and they consisted of partially decomposed PVP, partially pyrolyzed Ti—O—Ti gel, and partially carbonized poly(furfuryl alcohol). The subsequent carbothermal reduction in argon at 1400° C. completely removed the PVP and the Ti—O—Ti gel was turned to $TiO_2$. Moreover, the freshly generated carbon and $TiO_2$ reacted almost instantly and formed TiC. The initially formed TiC possibly was in an amorphous form, such that when homogeneous nucleation did occur, it led to the formation of the TiC crystallites.

In optional aspects of the present invention, the total amounts of Ti and C atoms can be precisely controlled and the optimal heat treatment applied, thereby resulting in completely polycrystalline nanofibers and/or nano-ribbons. However, the TiC nanofibers and/or ribbons (having TiC crystallites embedded in the amorphous carbon matrix) would also be desirable because the amorphous matrix would facilitate the high temperature $Cl_2$ treatment to selectively remove titanium.

After the chlorination treatment of the electrospun precursor (with 70 wt % of TiC and 30 wt % of carbon) at 600° C., the TiC-CDC nanofibers showed an average pore size of ~1 nm, and a high specific surface area of ~1390 $m^2/g$. It is to be understood that the average pore size and specific surface area can be tailored through adjusting the weight fractions of TiC and C in the electrospun precursor, and through adjusting the processing parameters of chlorination treatment.

The electrospun TiC nano-fibrous felts and the derived TiC-CDC nano-felts have applications including catalyst support, gas storage and super-capacitors.

(ii) Physical Structure of the Nano-Felts:

The present invention provides a mechanically resilient mat (i.e., a "felt") made out of the continuous nanofibers or nano-ribbons overlayed on top of one another. The individual fibers/ribbons making up this nano-felt consisted of TiC nanocrystallites embedded in a continuous matrix of disordered carbon. Based on theremgravity and image analysis performed on one sample, the disordered carbon was about 25-30 wt %. In addition, the nanocrystallites were surrounded by a few layers (shells) of graphitic carbon.

Figure 4A:
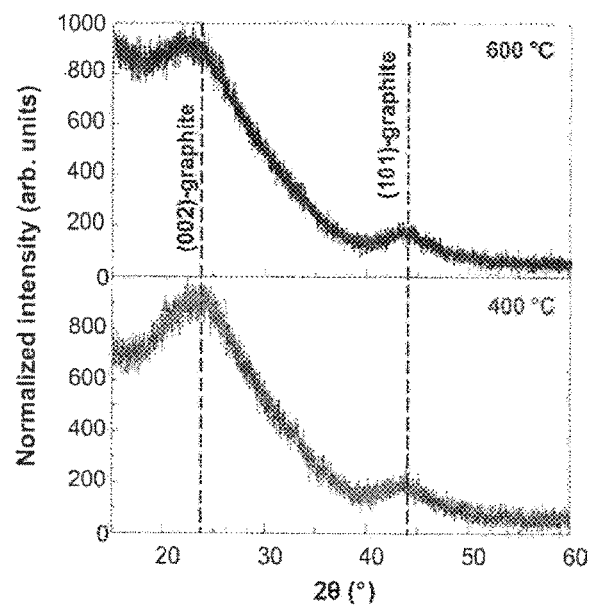
FIG. 4A is an X-ray Diffraction (XRD) of the TiC-CDC nano-felts and their precursor of electrospun TiC nano-fibrous felts.
Figure 4B:
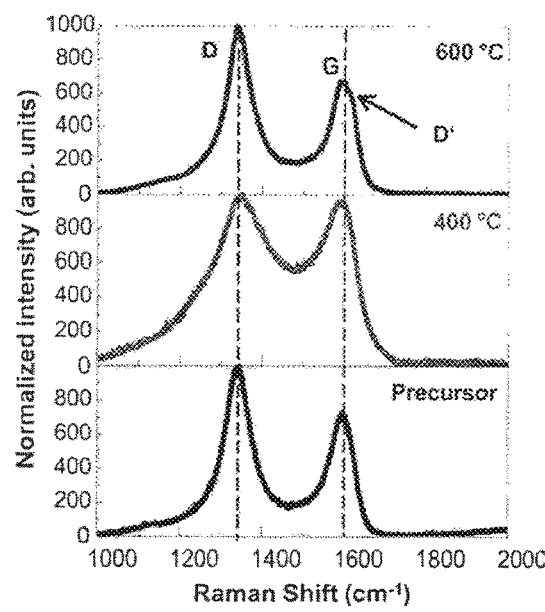
FIG. 4B is a Raman spectra of the TiC-CDC nano-felts and their precursor electrospun TiC nano-fibrous felts.

The resulting nano-felt could be bent without breaking within the linear elastic range, and a maximum bending angle of 30° was observed (corresponding to a strain of 0.01 for a 200 μm thin felt). FIGS. 3a/3c and 3b/3d illustrate exemplary TEM images of a TiC-CDC nano-felt after chlorination at 400° C. and 600° C., respectively. Based on gravimetry, an effective density of 0.14 $g/cm^3$ was measured, corresponding to a porosity of 94 vol % (comprising the micro- and meso-porosities, and inner fabric space). With the selected chlorination conditions, no residual carbide was found in the resulting TiC-CDC nano-felts. (See FIG. 4a showing XRD and FIG. 4b showing Raman spectra of the nano-felts and their precursor electrospun TiC nano-fibrous felt). Only the D and G modes of graphitic and disordered (i.e., amorphous) carbon were visible in the precursor's spectrum (FIG. 4b). The nano-felt made from chlorination at the lower (400° C.) temperature had a larger amount of disordered carbon, and a higher amount of graphitic carbon, than the nano-felt made at the higher (600° C.) temperature. Table 1 shows the corresponding band position, Full Width at Half Maximum (FWHM) and $I_d/I_g$ for these TiC-CDC nano-felts and their electrospun precursor. As can be seen, the TiC-CDC nano-felt made at 400° C. had a larger amount of disordered carbon (because it had a higher $I_d/I_g$ ratio). When the chlorination temperature was increased to 600° C., the amount of graphitic carbon increased and the $I_d/I_g$ ratio decreased.

Figure 5A:
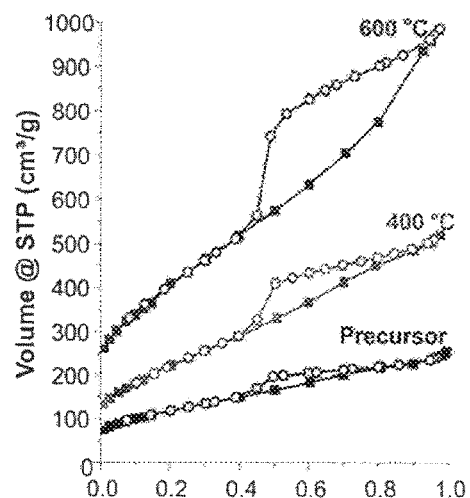
FIG. 5A shows a nitrogen sorption isotherms of the TiC-CDC nano-felts (prepared at 400° C. and 600° C.) and their electrospun precursor.
Figure 5B:
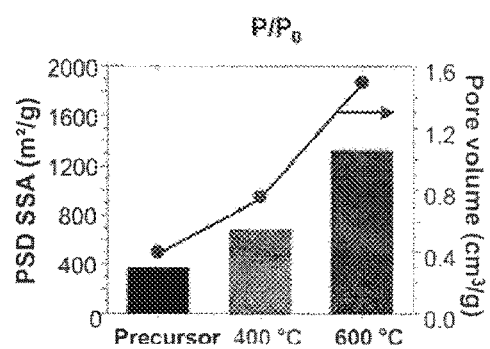
FIG. 5B shows SSA (specific surface area) values of the TiC-CDC nano-felts (prepared at 400° C. and 600° C.) and their electro spun precursor.
Figure 5C:
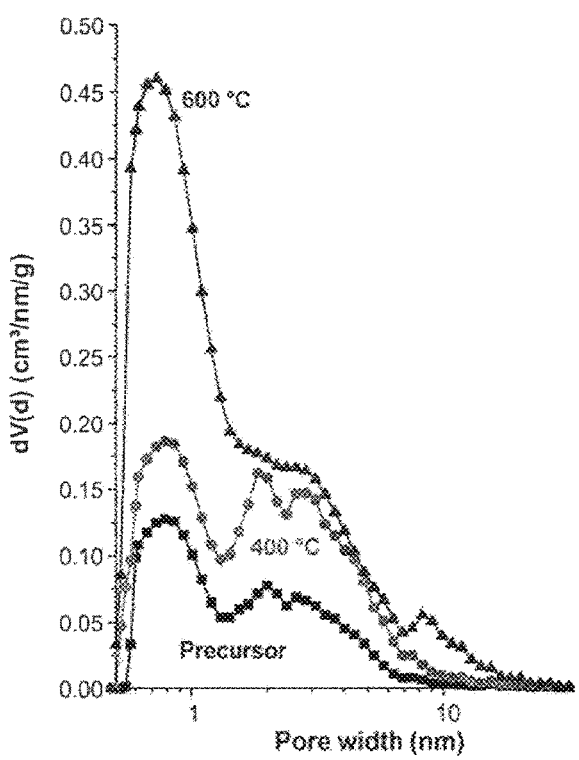
FIG. 5C shows pore volumes of the TiC-CDC nano-felts (prepared at 400° C. and 600° C.) and their electrospun precursor.

Table 2 shows the corresponding values of SSA, PSD, and pore volume acquired from $N_2$ and $CO_2$ gas sorption isotherms for the TiC-CDC nano-felts and their electrospun precursor. As can be seen, increasing the chlorination temperature increased the SSA and the total pore volume. FIGS. 5a, 5b and 5c correspond to Table 2, with FIG. 5a showing nitrogen sorption isotherms, FIG. 5b showing SSA values and FIG. 5c showing pore volumes of the nanofelts and their electrospun precursor prepared at 400° C. and 600° C.

(iii) Electrical Performance of the TiC-CDC Nano-Felts:

As can be appreciated, the present invention's combination of nano-scale pores, partially graphitic carbon (which is electrically conductive) and continuous fibers may be particularly useful in super-capacitor electrode applications. In addition, these present fibrous felts have a large inter-fiber porosity that can allow the easy access of electrolytes and improve power-handling capacity.

Electrochemical measurements were taken of another sample of the TiC-CDC nano-felt. These measurements showed a high gravimetric capacitance of 110 F/g in an aqueous electrolyte (1 M $H_2SO_4$) and 65 F/g in an organic electrolyte (1.5 M TEA-BF4 in acetonitrile). Because of the unique structure of the felt, a fade of the capacitance of only 50% at a high scan rate of 5 V/s was observed. A fade of just 15% was observed when tested in 1 M $H_2SO_4$ at 1 V/s, resulting in a high gravimetric capacitance of 94 F/g. This is excellent since such a high performance was previously only achieved with technologies like graphene or carbon-based supercapacitors (which require binders for their formation).

Figure 6A:
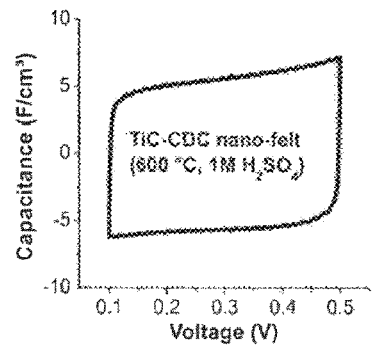
FIG. 6A is a cyclic voltammogram of the TiC-CDC nano-felt.
Figure 6B:
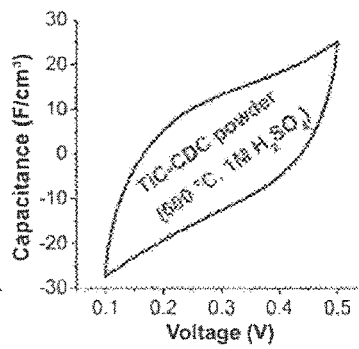
FIG. 6B is a cyclic voltammogram of carbon onions.
Figure 6C:
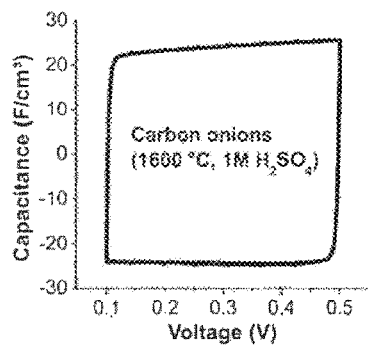
FIG. 6C is a cyclic voltammogram of conventional TiC-CDC powder.
Figure 6D:
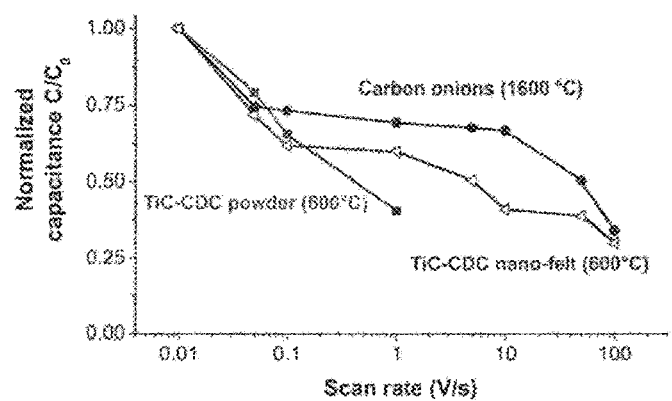
FIG. 6D is a plot of scan rate vs. normalized capacitance for the samples of FIGS. 6A, 6B and 6C.

Comparison tests were also done on conventional TiC-CDC powders, carbon onions and nano-diamonds. What was found was that the TiC-CDC nano-felts and carbon onions showed pronounced capacitive behavior at high scan rates, whereas the (conventional) TiC-CDC powder had a resistive behavior. Specifically, FIG. 6a illustrates cyclic voltammograms of the TiC-CDC nano-felt, compared to conventional micron-sized TiC-CDC powder tested in MCE at 1 V/s in 1 M $H_2SO_4$ (FIG. 6b), and to carbon onions (FIG. 6c). As can be seen, the present TiC-CDC nano-felt displayed a higher capacitance across a range of frequencies as compared to TiC-CDC powder (FIG. 6b). A similar high frequency behavior was also seen in the carbon onions (FIG. 6c). FIG. 6d is a comparison plot of the scan rate vs. normalized capacitance for these three samples. As can be seen, the total capacitance of the present nano-felt was lower. This is due to its smaller specific surface area.

Further electrical performance measurements were taken as follows. FIGS. 7a and 7b illustrate cyclic voltammograms for the TiC-CDC nano-felt and its electrospun precursor produced according to the present invention. FIG. 7c shows the gravimetric capacitance and galvanic charge/discharge measurements for the nano-felt and its precursor in organic and aqueous electrolytes in comparison for different current densities. FIG. 7d shows a comparison between the fade and in normalized capacitance and in the MCE. As can be seen, powder based super-capacitors have inferior power handling capacity. In contrast, with the present TiC-CDC nano-felts, conductivity is not lost as the conductive fibers remain intact. Thus, with a comparable capacitance in aqueous electrolytes, the TiC-CDC nano-felts showed a power handling comparable to graphene based super-capacitors. FIG. 7e shows the frequency dispersion of the phase angle. As can be seen, the phase angle is very close to −90° for frequencies up to 1 Hz, which indicates a function being very close to an ideal capacitor. Lastly, FIG. 7f shows the cycling stability at 100 mA galvanostatic charge/discharge (being much higher than for conventional TiC-CDC films). As can be seen, the high capacitance of TiC-CDC nano-felts (synthesized at 600° C.) did not fade over thousands of cycles.

The above results of the electrochemical testing showed that the nano-felts retained 50% and 30% of their capacitance at the enormous scan rates of 5 V/s and 100 V/s, respectively. This is a much lower decrease in capacitance as compared to activated carbon or conventional TiC-CDC powder.

With the combination of superior electrochemical properties and mechanical flexibility/stability, the present TiC-CDC nano-felts may be important in applications for the development of high performance super-capacitors and/or flexible electrodes. This is due in part to the fact that the TiC-CDC nano-felts retained the morphological properties of the precursor, yet had substantially higher values of SSA and pore volume.

Testing was also done on the present TiC-CDC nano-felts when synthesized at 1000° C. At this high synthesis temperature (1000° C.), the fibers in the nano-felt consist of a pore network in which the pores are separated by one or two carbon layers only. This testing showed gravimetric capacitances of up to 135 F/g in aqueous and 120 F/g in organic electrolytes. In addition, approximately 50% of the low-rate capacitance was maintained at a very high scan rate of 5 V/s.

It was determined that raising the chlorination temperature increases the SSA and the pore volume of the TiC-CDC nano-felts and their electrospun precursor. In addition, it was shown that low synthesis temperature (<400° C.) resulted in an amorphous structure. Increasing the synthesis temperature to 600° C. and above resulted in a more ordered carbon structure.

The present TiC-CDC was shown to have a high gravimetric and volumetric capacitance. After chlorination, the present porous nano-felts maintain their size, shape and flexibility. While small pores account for large surface area (and therefore high capacitance) larger pores facilitate ion mobility through the TiC-CDC felts.

Experimentation was then performed to determine the relationship between chlorination temperature and the resulting TiC-CDC structure (in terms of carbon ordering, pore size, pore size distribution, and surface area), and the properties of conductivity, series resistance, capacitance and rate handling ability.

Figure 8A:
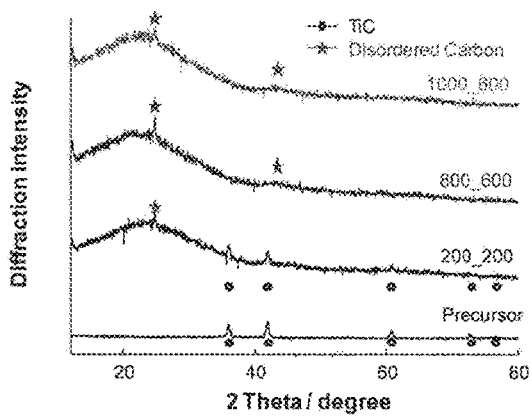
FIG. 8A illustrates XRD pattern results of TiC-CDC nano-felts and their electrospun TiC nano-felt precursor.
Figure 8B:
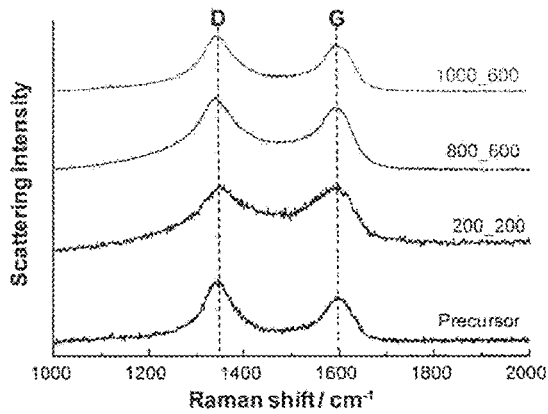
FIG. 8B illustrates Raman scattering results (with a peak at the D-mode) of TiC-CDC nano-felts and their electrospun TiC nano-felt precursor.
Figure 8C:
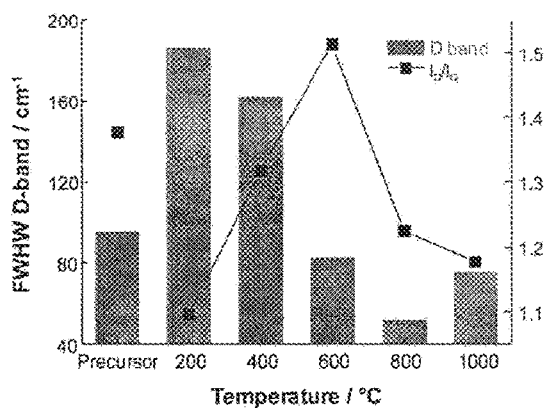
FIG. 8C illustrates FWHW measurements of TiC-CDC nano-felts and their electrospun TiC nano-felt precursor.
Figure 8D:
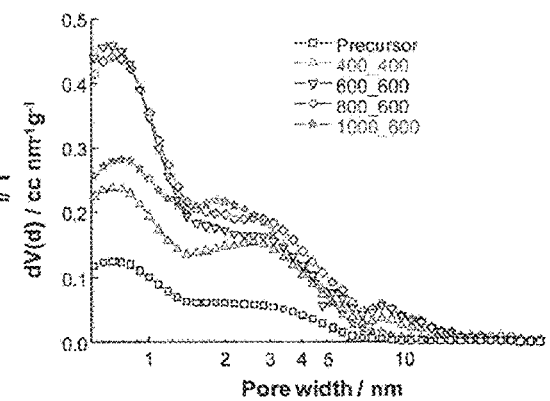
FIG. 8D illustrates pore width measurements of TiC-CDC nano-felts and their electrospun TiC nano-felt precursor.
Figure 8E:
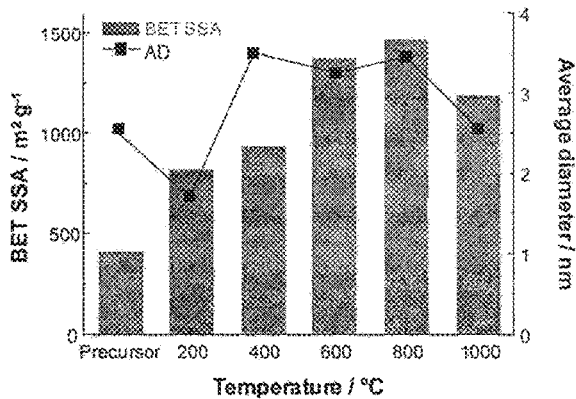
FIG. 8E illustrates SSA measurements of TiC-CDC nano-felts and their electrospun TiC nano-felt precursor.
Figure 9A:
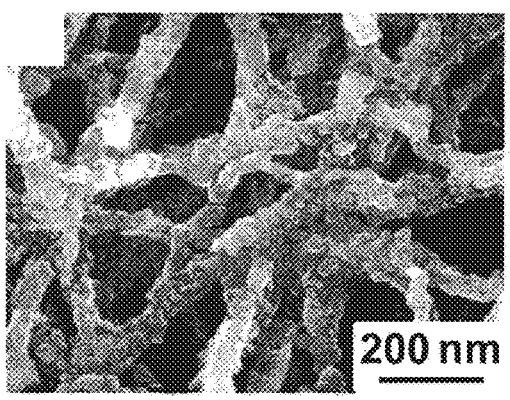
FIG. 9A is an electron micrograph of electrospun TiC precursor nano-felt at low magnification.
Figure 9B:
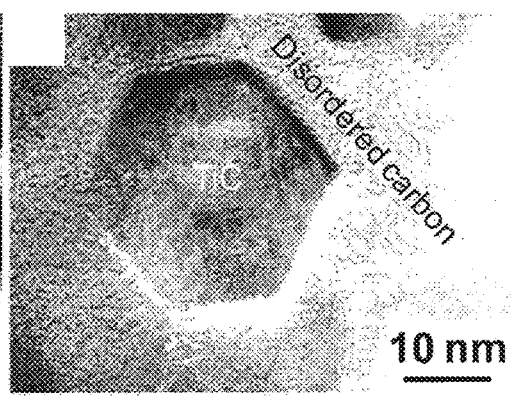
FIG. 9B is an electron micrograph of electrospun TiC precursor nano-felt of FIG. 9A at higher magnification.
Figure 9C:
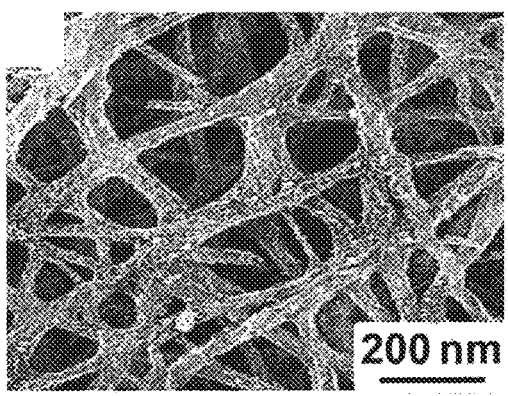
FIG. 9C is an electron micrograph of the TiC-CDC nano-felt after chlorination at 200° C.
Figure 9D:
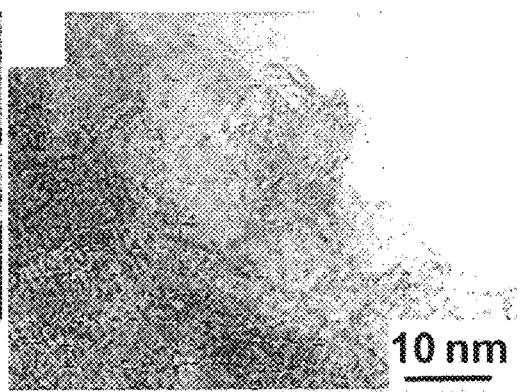
FIG. 9D is an electron micrograph of the nano-felt of FIG. 9C at higher magnification.
Figure 9E:
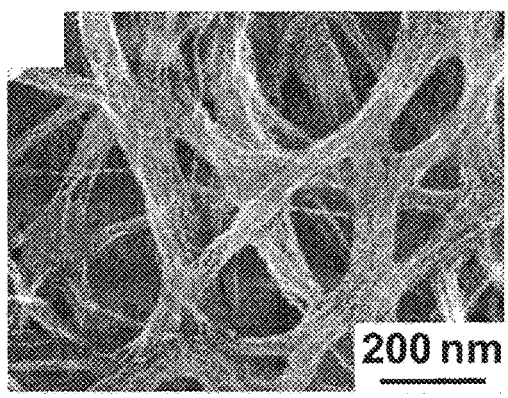
FIG. 9E is an electron micrograph of the TiC-CDC nano-felt after chlorination at 800° C.
Figure 9F:
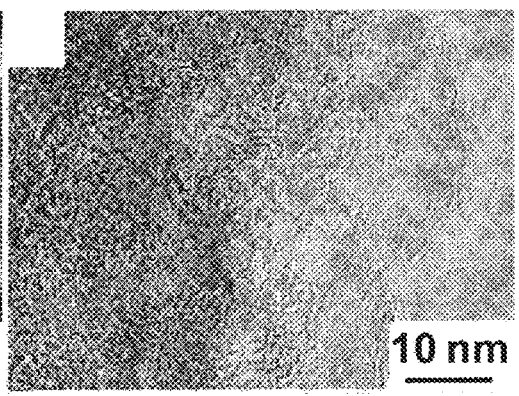
FIG. 9F is an electron micrograph of the nano-felt of FIG. 9E at higher magnification.
Figure 9G:
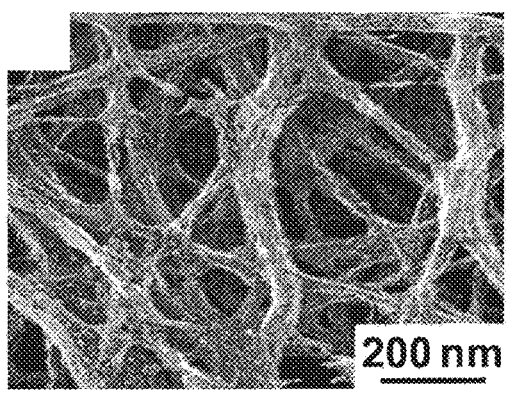
FIG. 9G is an electron micrograph of the TiC-CDC nano-felt after chlorination at 1000° C.
Figure 9H:
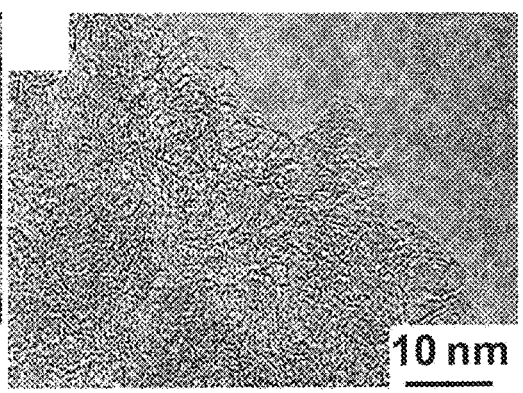
FIG. 9H is an electron micrograph of the nano-felt of FIG. 9G at higher magnification.

As seen in the XRD pattern of FIG. 8a, trace amounts of unreacted nano-TiC were only found in the nano-felt chlorinated at 200° C. The two broad peaks centered at ~24° and ~44° show a diffuse scattering that corresponds to disordered carbon. FIG. 8b shows a Raman scattering with a peak at the D-mode (being characteristic for disordered carbon with crystallites). It was also determined that the capacitance also increases with the chlorination temperature. FWHW measurements are shown in FIG. 8c. Pore width measurements are shown in FIG. 8d and SSA measurements are shown in FIG. 8e. Nitrogen sorption was used to characterize the PSD, SSA and pore volume of TiC-CDC. Table 3 shows that raising the chlorination temperature increases the SSA and the pore volume.

FIGS. 9a to 9h show electron micrographs of various nano-felts made according to the present invention. Photos 9a and 9b show an electrospun TiC precursor nano-felt. Images of c and d show a TiC-CDC nano-felt after chlorination at 200° C. Images e and f show a TiC-CDC nano-felt after chlorination at 800° C. Lastly, images g and h show a TiC-CDC nano-felt after chlorination at 1000° C.

As can be seen, the electrospun TiC precursor nanofibers/nano-felts is composed of nano-scaled TiC crystallites embedded in a carbon matrix. Upon chlorination at 200° C., the nano-felt is predominantly amorphous carbon with residual graphite layers around the former TiC nanocrystals that have been completely transformed into CDC. Higher chlorination temperatures result in higher order of carbon structure.

TABLE 1

Band position, FWHM, and $I_d/I_g$ ratio from Raman spectra of TiC-CDC nano-felts and their electrospun precursor.

| | D-mode ($cm^{-1}$) | | G-mode ($cm^{-1}$) | | Ratio |
|---|---|---|---|---|---|
| | Position | FWHM | Position | FWHM | $I_D/I_G$ |
| Nano-felt (600° C.) | 1343.0 | 88.1 | 1593.8 | 68.6 | 1.52 |
| Nano-felt (400° C.) | 1353.0 | 186.6 | 1600.6 | 66.3 | 1.64 |
| Precursor | 1341.7 | 80.2 | 1592.7 | 80.4 | 1.43 |

TABLE 2

Values of SSA, PSD, and pore volume acquired from $N_2$ and $CO_2$ gas sorption for TiC-CDC nano-felts and the precursor.

| | BET SSA ($m^2/g$) | PSD SSA ($m^2/g$) | Total Pore volume ($cm^3/g$) | Volume of pores <2.5 nm ($cm^3/g$) | Average pore size (nm) |
|---|---|---|---|---|---|
| Nano-felt (600° C.) | 1390 | 1319 | 1.50 | 0.27 | 0.9 |
| Nano-felt (400° C.) | 738 | 696 | 0.76 | 0.14 | 1.5 |
| Precursor | 414 | 371 | 0.40 | 0.09 | 1.1 |

TABLE 3

Values of SSA, pore size, and pore volume acquired from $N_2$ gas sorption for TiC-CDC nano-felts and the precursor at −196.15° C.

| | BET SSA** ($m^2g^{-1}$) | DFT SSA ($m^2g^{-1}$) | Total Pore volume ($cm^3g^{-1}$) | Average pore size# (nm) |
|---|---|---|---|---|
| Precursor | 409 | 384 | 0.33 | 2.55 |
| Nano-felt (200° C.) | 862 | 795 | 0.56 | 1.75 |
| Nano-felt (400° C.) | 935 | 843 | 0.98 | 3.55 |
| Nano-felt (600° C.) | 1374 | 1430 | 1.27 | 3.25 |
| Nano-felt (800° C.) | 1468 | 1352 | 1.43 | 3.46 |
| Nano-felt (1000° C.) | 1188 | 834 | 0.95 | 2.56 |

**The BET SSA was calculated in the linear regime between 0.05 and 0.30 $P/P_0$.
*DFT SSA was calculated assuming slit-pore geometry using QSDFT deconvolution.
The average pore size is the volume-weighted average diameter based on QSDFT data.

What is claimed is:

1. A mechanically resilient carbide-derived-carbon (CDC) nano-fibrous felt prepared by the process comprising:
   electrospinning a spin dope for making precursor nano-fibers with diameters less than 0.5 pm, wherein the spin dope comprises a Ti precursor and a C precursor, and wherein the Ti precursor comprises a titanium alkoxide and the C precursor comprises furfuryl alcohol;
   overlaying the precursor nanofibers to produce a precursor nano-fibrous felt; and
   heating the precursor nano-fibrous felt under an argon gas flow first at a low temperature in the range between 250° C. and 425° C., and then at a high temperature in the range from 1,000° C. to 1,500° C. and making an electrospun continuous Titanium Carbide (TiC) nano-fibrous felt with TiC crystallites embedded in a carbon matrix by carbothermal reduction; and
   chlorinating the electrospun continuous TiC nano-fibrous felt at a temperature of between 200° C. to 1000° C. to remove titanium for producing a carbide-derived-carbon (CDC) nano-fibrous felt.

2. The nano-fibrous felt of claim 1, wherein the Ti precursor is a titanium alkoxide.

3. The nano-fibrous felt of claim 1, wherein the spin dope further comprises:
   a carrying polymer;
   a solvent; and
   a catalyst.

4. The nano-fibrous felt of claim 1, wherein the electrospinning is performed on a spin dope containing 10 wt % titanium (IV) n-butoxide, 10 wt % furfuryl alcohol, 10 wt % polyvinylpyrrolidone and 2.5 wt % acetic acid.

5. The nano-fibrous felt of claim 1, wherein heating the precursor nano-fibrous felt for the preparation of the nano-fibrous felt with TiC crystallites embedded in carbon matrix was carried out at first at a low temperature for about 6 hours and then at the high temperature for about 12 hours.

6. The nano-fibrous felt of claim 1, wherein the spin dope comprises titanium (IV) n-butoxide, furfuryl alcohol, polyvinylpyrrolidone, N,N-dimethylformamide, and acetic acid.

7. The nano-fibrous felt of claim 1, wherein the low temperature is around 325° C. or 425° C., and the high temperature is around 1400° C.

8. The nano-fibrous felt of claim 1, wherein the temperature for chlorinating the electrospun continuous nano-fibrous felt is around 600° C.

* * * * *

UNITED STATES PATENT AND TRADEMARK OFFICE
CERTIFICATE OF CORRECTION

PATENT NO. : 10,519,580 B2
APPLICATION NO. : 14/551348
DATED : December 31, 2019
INVENTOR(S) : Hao Fong et al.

It is certified that error appears in the above-identified patent and that said Letters Patent is hereby corrected as shown below:

In the Claims

<u>In Column 10, Claim 1, Line 18:</u>
DELETE "0.5 pm" after than
INSERT --0.5 µm-- after than Signed and Sealed this
Twenty-fifth Day of February, 2020

Andrei Iancu
*Director of the United States Patent and Trademark Office*